(12) United States Patent
Kim

(10) Patent No.: US 9,930,618 B2
(45) Date of Patent: Mar. 27, 2018

(54) APPARATUS AND METHOD FOR CONTROLLING OPERATION MODE IN A WIRELESS TERMINAL

(71) Applicant: Samsung Electronics Co., Ltd., Suwon-si, Gyeonggi-do (KR)

(72) Inventor: Hye-Jeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 14/063,111

(22) Filed: Oct. 25, 2013

(65) Prior Publication Data

US 2014/0119256 A1   May 1, 2014

(30) Foreign Application Priority Data

Oct. 27, 2012 (KR) ........................ 10-2012-0120055

(51) Int. Cl.
*H04W 52/02* (2009.01)
*H04W 76/04* (2009.01)

(52) U.S. Cl.
CPC ... *H04W 52/0209* (2013.01); *H04W 52/0216* (2013.01); *H04W 76/048* (2013.01); *Y02B 60/50* (2013.01)

(58) Field of Classification Search
None
See application file for complete search history.

(56) References Cited

U.S. PATENT DOCUMENTS

| 7,369,815 | B2 * | 5/2008 | Kang et al. ................. 455/73 |
| 7,610,035 | B2 | 10/2009 | Van Bosch et al. |
| 2005/0054372 | A1 | 3/2005 | Tsuda et al. |
| 2005/0064829 | A1 | 3/2005 | Kang et al. |
| 2005/0066067 | A1 | 3/2005 | Suh |
| 2008/0170526 | A1 | 7/2008 | Narang et al. |
| 2009/0016252 | A1 | 1/2009 | Ho et al. |
| 2009/0154385 | A1 * | 6/2009 | Makhija et al. ............. 370/311 |
| 2010/0331019 | A1 | 12/2010 | Bhattacharjee et al. |
| 2011/0105069 | A1 | 5/2011 | Gall et al. |
| 2012/0115552 | A1 | 5/2012 | Bhattacharya |
| 2012/0147937 | A1 | 6/2012 | Goss et al. |

FOREIGN PATENT DOCUMENTS

| CN | 1613246 A | 5/2005 |
| CN | 101897224 A | 11/2010 |
| EP | 2 071 893 A1 | 6/2009 |
| JP | 2007-214898 A | 8/2007 |

* cited by examiner

*Primary Examiner* — Kouroush Mohebbi
(74) *Attorney, Agent, or Firm* — Jefferson IP Law, LLP

(57) ABSTRACT

An apparatus and a method for controlling a Discontinuous Reception (DRX) mode in which a Communication Processor (CP) performs a predetermined operation by switching between a sleep state and an active state in a wireless terminal having an Application Processor (AP) and the CP are provided. The method includes recording a control program configured for the active state in an internal memory of the CP, waking up from the sleep state to the active state at every predetermined interval, and performing an operation required in the active state by executing the control program recorded in the internal memory via the CP, wherein the control program is a complete control module or a part of the complete control module.

18 Claims, 2 Drawing Sheets

APPARATUS AND METHOD FOR CONTROLLING OPERATION MODE IN A WIRELESS TERMINAL

CROSS-REFERENCE TO RELATED APPLICATION(S)

This application claims the benefit under 35 U.S.C. § 119(a) of a Korean patent application filed on Oct. 27, 2012 in the Korean Intellectual Property Office and assigned Serial No. 10-2012-0120055, the entire disclosure of which is hereby incorporated by reference.

TECHNICAL FIELD

The present disclosure relates to an apparatus and method for controlling an operation mode in a wireless terminal, which controls a sleep mode operation.

BACKGROUND

In general, the size, weight, and the like of a wireless terminal are major constraints in developing a wireless terminal with enhanced mobility. These constraints are obstacles to increasing the battery capacity of the wireless terminal.

Accordingly, there exists a need for reducing power consumption of the wireless terminal in consideration of the limited battery capacity. For example, idle mode and connected mode are basic modes for the wireless terminal. If a predetermined condition is satisfied in a basic mode, the wireless terminal operates in standby mode. A major example of the standby mode is Discontinuous Reception (DRX) mode. For the convenience of description, the term DRX mode will be used uniformly.

The DRX mode supports a sleep state and an active state. The wireless terminal performs only a minimum required operation in the sleep state to reduce power consumption, whereas the wireless terminal performs a normal operation in the active state. The minimum required operation may be to monitor a paging signal in specific slots preset between the wireless terminal and a base station.

In the DRX mode, the wireless terminal wakes up only in predetermined slots and sleeps in the other slots. Therefore, the wireless terminal can reduce power consumption in the DRX mode.

Since the wireless terminal wakes up only during a specific interval (an allocated slot) and monitors a paging message from the base station and sleeps during the remaining interval, the power consumption of the wireless terminal can be reduced. Most of the components of the wireless terminal are inactive in the sleep state, without power supply to these components. In this respect, the sleep state is also called a power saving mode.

As described above, the wireless terminal repeats a wake-up state (i.e. an active state) and a sleep state in the DRX mode. Upon detection of a paging message directed to the wireless terminal from the base station in the wake-up state, the wireless terminal performs a necessary process.

Control programs that control a connected mode operation and a DRX mode operation of the wireless terminal are stored in a main memory. Therefore, the wireless terminal accesses the main memory, reads a related control program, and loads the read control program in a cache memory to thereby perform an operation according to a current situation. The same thing applies to the DRX mode.

For example, a processor of the wireless terminal accesses the main memory, reads a control program required to receive a paging message, loads the read control program in the cache memory, and receives and processes a paging message using the loaded control program.

While the power consumption of the wireless terminal is reduced in the DRX mode, the wireless terminal should activate related hardware to access the main memory, read a related control program, and load the read control program in the cache memory, thus increasing power consumption.

Particularly, a wireless terminal having two different processors, such as a smartphone, may use power in the DRX mode. For example, the wireless terminal may be equipped with a plurality of processors serving different purposes, such as an Application Processor (AP) that provides overall control to operations of the wireless terminal and a Communication Processor (CP) that controls overall communication of the wireless terminal.

In this case, the CP is responsible for managing the DRX mode operation. Accordingly, if the AP and the CP share the main memory, some hardware block of the AP should be activated to enable the CP to read a control program from the main memory in the DRX mode. As compared to a wireless terminal having a single processor or an independent memory for each processor, this wireless terminal may consume more power.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a power control apparatus and method for reducing power consumption in a Discontinuous Reception (DRX) mode operation in a wireless terminal.

Another aspect of the present disclosure is to provide an apparatus and method for controlling a DRX mode operation by a Communication Processor (CP) in a wireless terminal having an Application Processor (AP) and the CP.

Another aspect of the present disclosure is to provide an apparatus and method for controlling power consumption of a DRX mode operation by a CP in a wireless terminal having the CP and an AP that are separately configured.

Another aspect of the present disclosure is to provide a hardware structure for minimizing power consumption in executing a DRX mode control program in a wireless terminal having the CP and an AP that are separately configured.

Another aspect of the present disclosure is to provide a power control apparatus and method for allowing a CP to pre-load a DRX mode control program onto an internal cache memory in a wireless terminal having the CP and an AP that are separately configured.

Another aspect of the present disclosure is to provide a power control apparatus and method for recoding a DRX mode control program in an internal memory of CP, and executing the recoded DRX mode control program in a wireless terminal having the CP and an AP that are separately configured.

In accordance with an aspect of the present disclosure, a method for controlling a DRX mode in which a CP performs a predetermined operation by switching between a sleep state and an active state in a wireless terminal having an AP and the CP is provided. The method includes recording a control program configured for the active state in an internal memory of the CP, waking up from the sleep state to the active state at every predetermined interval, and performing an operation required in the active state by executing the control program recorded in the internal memory via the CP, wherein the control program is a complete control module or a part of the complete control module.

In accordance with another aspect of the present disclosure, an apparatus for controlling a DRX mode in which a CP performs a predetermined operation by switching between a sleep state and an active state in a wireless terminal having an AP and the CP is provided. The apparatus includes an internal memory configured to record a control program configured for the active state, and a controller configured to wake up from the sleep state to the active state at every predetermined interval, and to perform an operation required in the active state by executing the control program recorded in the internal memory, wherein the control program is a complete control module or a part of the complete control module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
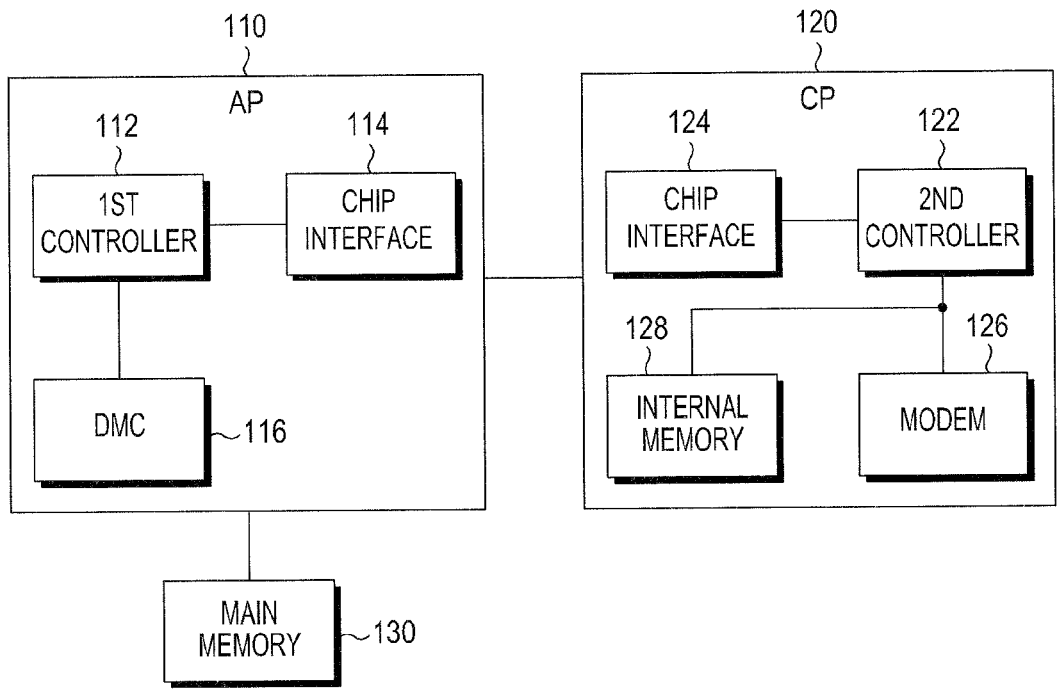
FIG. 1 is a block diagram of a wireless terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Use of the term "substantially" refers to a scenario in which the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

Various embodiments of the present disclosure are provided to achieve at least the above-described technical aspects of the present disclosure. In an implementation, defined entities may have the same names, to which the present disclosure is not limited. Thus, various embodiments of the present disclosure can be implemented with the same or ready modifications in a system having a similar technical background.

In various embodiments of the present disclosure, a Communication Processor (CP) of a wireless terminal configures a control program for a Discontinuous Reception (DRX) mode operation (hereinafter, referred to as a DRX mode control program) and stores the DRX mode control program in an internal memory. When the CP wakes up from a sleep state, the CP accesses the internal memory and performs an operation based on the stored DRX mode control program.

The DRX mode control program may be configured according to the size of the internal memory. If the internal memory is large enough, a DRX mode control program configured to enable an overall DRX mode operation is stored in the internal memory.

On the other hand, if the internal memory is insufficient, a DRX mode control program configured to enable part of the DRX mode operation, for example, an operation of monitoring a paging message, is stored in the internal memory. A paging message should be monitored in every predetermined slot in the DRX mode. The remaining processes of the DRX mode operation may be recorded in one of the internal memory of the CP or a main memory outside the CP, taking into account the memory size of the CP.

For example, a new control program may be written irrespective of a control program stored in the main memory and stored in the internal memory of the CP.

To enable the above operation, a new signaling procedure needs to be defined in order to exchange information to be shared between the control program of the main memory and the DRX mode control program of the internal memory. For example, if software corresponding to an additional control program is configured, the software may be written in micro code without using an Operating System (OS), thereby reducing complexity.

In another example, a part of the control program stored in the main memory may be pre-loaded and stored as a control program in the internal memory of the CP. That is, a control program corresponding to some blocks of the control program stored in the main memory may be pre-loaded onto the internal memory while the CP operates in an internal mode. For this purpose, the internal memory is preferably software-compatible with the main memory. For example, such a software compatible memory may be a Tightly Coupled Memory (TCM), an L1 cache, an L2 cache, or the like.

In another example, if the size of a block required for an internal mode operation is smaller than the size of an effective area of the internal memory, the CP does not access the external memory during the internal mode operation. Otherwise, only a part of the block required for the internal mode operation can be loaded onto the internal memory. Therefore, when a non-loaded block is executed, the CP accesses the external memory to thereby perform a necessary process.

In the foregoing first implementation example, if a memory serving any other usage is used as the internal memory of the CP, it is necessary to define an additional procedure for loading a control program used in the internal mode (hereinafter, referred to as an internal mode control program) onto the internal memory or loading a control program used in a normal mode (hereinafter, referred to as a normal mode control program) onto the internal memory, each time switching occurs between the internal mode and the normal mode.

For example, the wireless terminal loads an internal mode control program and monitors a paging message from a base station using the internal mode control program in the internal mode. Upon receipt of a paging message from the base station or if another process such as measurement, idle handover, or the like is requested, the wireless terminal switches from the internal mode to the normal mode, loads the normal mode control program, and performs an operation corresponding to the requested process.

In the first implementation example, if an internal mode dedicated memory is used as the internal memory of the CP, a whole or part of the internal mode control program is resident in the dedicated memory. If the speed of dedicated memory is sufficiently accessible, there is no need for loading a control program at the moment of switching between the internal mode and the normal mode. Otherwise, the internal mode control program is loaded onto a fast accessible internal memory such as a TCM when the normal mode is switched to the internal mode. Mode switching is performed in the same manner irrespective of the presence or absence of a dedicated internal memory except that the loading speed is faster in the dedicated internal memory than in the external memory.

As described above, when the wireless terminal wakes up from a sleep state and performs an operation, only minimum required hardware is activated and no access to the external memory (i.e. the main memory) is needed. Consequently, the power consumption of the sleep state can be reduced.

In the following description, a mode to which the wireless terminal switches to save power is referred to as DRX mode. The DRX mode is interchangeably used with slot mode, idle mode, or the like defined for $3^{rd}$ Generation (3G) mobile communication.

FIG. 1 is a block diagram of a wireless terminal according to an embodiment of the present disclosure.

Referring to FIG. 1, the wireless terminal is configured so that an Application Processor (AP) 110 and a CP 120 are independent chips and the CP 120 shares a main memory 130 with the AP 110, by way of example.

Referring to FIG. 1, the AP 110 includes a first controller 112, a chip interface 114, and a Dynamic Memory Controller (DMC) 116.

The first controller 112 provides overall control to operations of the AP 110. The chip interface 114 provides a device and a process required for the CP 120 to use a common external memory. The chip interface 114 may be, for example, a Chip to Chip (C2C) interface.

The DMC 116 controls the main memory 130 outside the AP 110 under the control of the first controller 112. For example, upon request of the AP 110 or the CP 120, the DMC 116 reads a specific block from the main memory 130 and provides the specific block to the AP 110 or the CP 120. In addition, the DMC 116 stores data received from the AP 110 or the CP 120 in the main memory 130. That is, the DMC 116 functions to manage the main memory 130 in response to an external request.

The main memory 130 stores control programs (i.e. software) corresponding to operations of the wireless terminal and outputs a specific software block in response to a request from the DMC 116.

The CP 120 includes a chip interface 124, a second controller 122, an internal memory 128, and a modem 126.

The second controller 122 provides overall control to the DRX mode, in which the wireless terminal performs a predetermined operation by switching between a wake-up state and a sleep state. For example, the second controller 122 monitors generation of an event triggering the DRX mode. Upon generation of the event, the second controller 122 switches from the normal mode to the internal mode. The normal mode refers to a mode in which the CP 120 operates based on a program stored in the main memory 130. The internal mode refers to a mode in which the CP 120 operates based on a program stored in the internal memory 128. When the CP 120 operates in the internal mode, the CP 120 does not need the AP 110 and the main memory 130, thus reducing unnecessary power consumption.

When the CP 120 switches from the normal mode to the internal mode, the second controller 122 provides a part or all of dependent variables and parameters used in the normal mode to an internal mode control program. The dependent variables and the parameters are used and updated during operations of the CP 120 including a DRX mode operation. These dependent variables and parameters should be maintained in both the normal mode and the internal mode.

The second controller 122 wakes up from the sleep state in every cycle preset for the DRX mode and performs a predetermined operation by executing a control program loaded in the internal memory 128. The predetermined operation may be to monitor reception of a paging message.

If an additional process that cannot be performed in the internal mode control program loaded in the internal memory 128 is requested during the predetermined operation, the second controller 122 switches from the internal mode to the normal mode. Since switching to the normal mode requires interaction between a part of the components of the AP 110 and the main memory 130, operation power is supplied to associated hardware.

The second controller 122 loads a corresponding control program from the main memory or another memory onto the internal memory 128 and performs an operation corresponding to the requested additional process based on the control program in the normal mode.

After the operation corresponding to the additional process is completed, the second controller 122 determines whether to switch to the DRX mode based on a predetermined condition preset to support the DRX mode.

Upon receipt of a request for switching to the DRX mode, the second controller 122 performs the above-described operation to switch from the normal mode for the additional process to the internal mode.

A cache memory provided in the CP 120 or a memory provided to support the DRX mode may be used as the internal memory 128. To reduce DRX mode power consumption, the internal memory 128 may use an internal mode control program (i.e. software) written in code or may pre-load a necessary control program (i.e. software) from the main memory 130.

To pre-load a necessary control program from the main memory 130, the internal memory 128 should be software-compatible with the main memory 130.

A control program to be loaded onto the internal memory 128 may be determined according to the capacity of the internal memory 128. As the capacity of the internal memory 128 is larger, a larger control program may be loaded and as the capacity of the internal memory 128 is smaller, a smaller control program may be loaded.

Accordingly, when the CP 120 is configured, it is preferred to determine an internal mode operation and provide the internal memory 128 having a capacity sufficient to load a control program corresponding to the determined internal mode operation.

The modem 126 exchanges information between the wireless terminal and an external network based on the control of the second controller 122.

As described before, since an internal mode control program, that is, a control program required for the wireless terminal to perform an internal mode operation according to the DRX mode is resident in the internal memory 128 in FIG. 1, power consumption can be reduced in the DRX mode.

Figure 2:
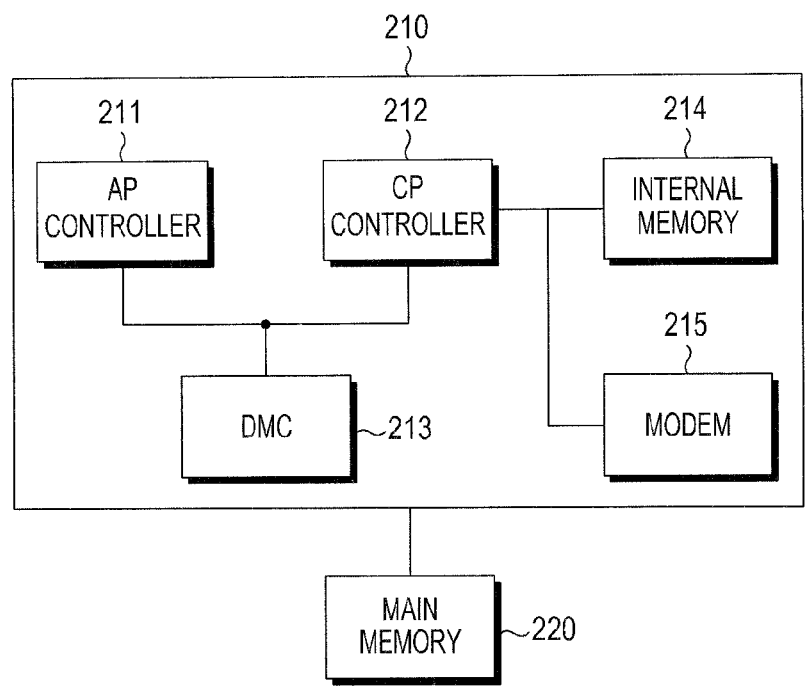
FIG. 2 is a block diagram of a wireless terminal according to another embodiment of the present disclosure.

FIG. 2 is a block diagram of a wireless terminal according to another embodiment of the present disclosure.

Referring to FIG. 2, the wireless terminal is configured so that an AP controller 211 and a CP controller 212 are integrated into a single chip and share one main memory 220, by way of example.

Compared to the embodiment illustrated in FIG. 1 in which the AP 110 and the CP 120 are configured on different chips, they are integrated into a single chip in FIG. 2. The components of FIG. 2 operate in the same manner as their counterparts in FIG. 1.

For example, the CP controller 212 provides control to a DRX mode operation, like the second controller 122 illustrated in FIG. 1. An internal memory 214 loads an internal mode control program (i.e. software), like the internal memory 128 illustrated in FIG. 1.

Operations of the CP controller 212 and the internal memory 214 according to another embodiment of the present disclosure are performed in the same manner as the operations of the second controller 122 and the internal memory 128 illustrated in FIG. 1 and thus will not be described in detail herein.

Figure 3:
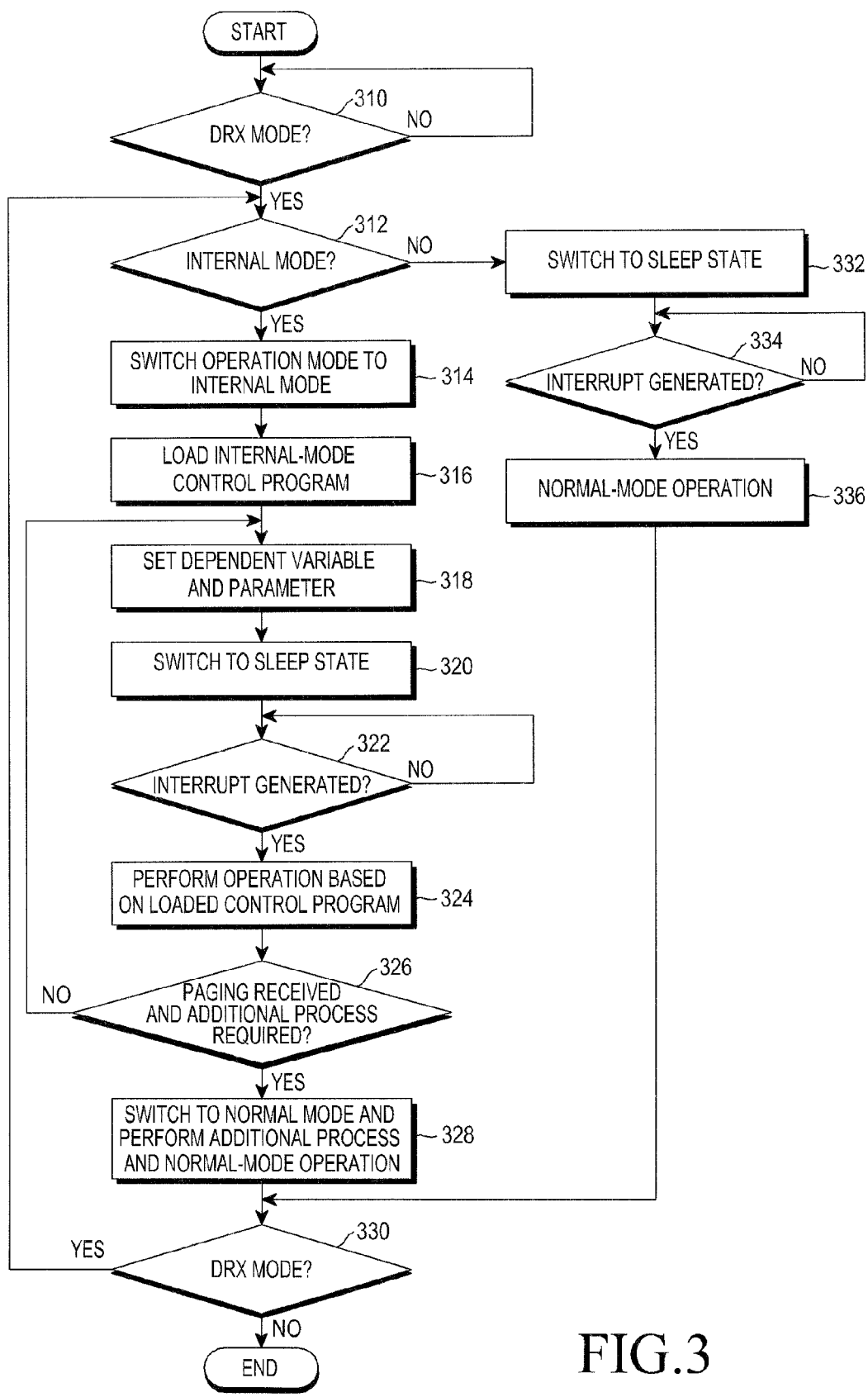
FIG. 3 is a flowchart illustrating an operation for controlling a Discontinuous Reception (DRX) mode operation in a wireless terminal according to an embodiment of the present disclosure.

FIG. 3 is a flowchart illustrating an operation for controlling a DRX mode operation in a wireless terminal according to an embodiment of the present disclosure.

The control operation of FIG. 3 is performed by a CP that controls the DRX mode in the wireless terminal. For example, the CP may be the second controller 122 illustrated in FIG. 1 or the CP controller 212 illustrated in FIG. 2. For the convenience of description, it is to be understood that the term 'controller' is used to refer to a component including the controller.

Referring to FIG. 3, a controller determines whether to switch to the DRX mode in operation 310. Switching to the DRX mode refers to switching from a normal operation state of the wireless terminal, for example, a connected mode to the DRX mode or from an idle mode to the DRX mode.

The term 'DRX mode' may be replaced with another term according to a communication scheme supported by the wireless terminal. For example, the wireless terminal may support $2^{nd}$ Generation (2G) mobile communication, 3G mobile communication, Long Term Evolution (LTE), or the like. A sleep mode is similar to the 'DRX mode' in 2G and 3G. However, these different terms are applicable in the similar meanings in the various embodiments of the present disclosure.

The controller may switch from the connected mode or the idle mode to the DRX mode in the wireless terminal in many cases. For example, if no data has been received from a base station for a predetermined time, the controller may switch to the DRX mode. In the idle mode, a CP operates in the DRX mode by default.

If the controller switches to the DRX mode, the controller initially operates in the normal mode. Then the controller determines whether to switch to the internal mode in operation 312. For example, if a condition triggering the sleep state of the DRX mode is satisfied, the controller may switch its operation mode to the internal mode in operation 314. Herein, 'operation mode' refers to a mode supported by the controller.

For example, operation modes may include the normal mode and the internal mode. The controller performs a predetermined operation based on a control program stored in a main memory in the normal mode, whereas the controller performs a predetermined operation based on a control program stored in an internal memory in the internal mode.

The internal mode is set to perform a predetermined operation when the wireless terminal switches from the connected mode or the idle mode to the DRX mode. The predetermined operation may be a process of monitoring a paging channel and receiving a paging message.

The normal mode is set to perform all operations of the CP including the predetermined operation performed in the internal mode.

If the internal memory has a sufficient size for an internal mode operation, the internal mode may be set to perform a specific operation normally performed in the normal mode in addition to the predetermined internal mode operation.

That is, a sleep-state operation of the DRX mode to be performed in the internal mode may be adaptively performed according to the size of the internal memory. As the internal memory has a larger size, the ratio of internal mode operations to DRX mode operations is increased. On the contrary, if the internal memory has a smaller size, the ratio of internal mode operations to DRX mode operations is decreased.

After switching to the internal mode, the controller loads an internal mode control program in operation 316. The internal mode control program is a control program corresponding to an operation to be performed in the internal mode. The internal mode control program is stored in the internal memory. The controller executes the internal mode control program stored in the internal memory.

For example, the internal mode control program loaded in the internal memory may be new software written in micro code or a part of blocks of a control program stored in the main memory. In the latter case, an internal cache or TCM may be used as the internal memory. The internal cache should be software-compatible with the main memory. If a memory provided in the controller is used as the internal memory, the controller should switch at an appropriate time point between loading of a necessary software block from the main memory to the internal memory and loading of a necessary software block in the main memory.

If new software is written to be loaded onto the internal memory, aside from the software in the main memory, the controller performs an additional signaling procedure to actively share information between the new software and the existing software.

That is, the controller sets a dependent variable and a parameter for use in performing an operation according to the loaded control program in operation 318. A part or all of dependent variables and parameters generated during a specific operation performed by loading an existing program from the main memory may be set.

The controller performs an additional procedure for sharing a dependent variable and a parameter with the normal mode software, that is, the normal mode control program, for use in an operation based on the internal mode software, that is, the internal mode control program.

After the controller completes setting the dependent variable and the parameter, the controller switches to the sleep state in operation 320. Switching to the sleep state can minimize the power consumption of the wireless terminal.

The controller monitors generation of an interrupt indicating switching from the sleep state to an active state at a predetermined time point in operation 322. For example, the controller switches from the sleep state to the active state by an interrupt generated in every paging slot. That is, the controller repeats 'wake-up (active state)' and 'sleep (sleep state)' in every predetermined cycle in the DRX mode.

Upon generation of the interrupt, the controller switches to the active state and performs a predetermined operation according to the control program loaded in the internal memory in operation 324. For example, the controller monitors reception of a paging message.

In operation 326, the controller determines whether an additional process is required as a result of the foregoing operation.

For example, the controller determines whether an additional process is needed, such as handover to another base station due to a received signal strength decreased below a threshold. The additional process required in the active state is known to the field of wireless communication and thus will not be limited to a specific process. However, it will be readily understood that although a specific additional process is not disclosed herein, the various embodiments of an additional process can be performed in the same manner.

If an additional process is required, the controller switches from the internal mode to the normal mode and performs the additional process in the normal mode in operation 328. The additional process refers to an operation requiring an additional active mode process that cannot be performed in the internal mode, such as Tracking Area Update (TAU) or Inter-Radio Access Technology (I-RAT)/neighbor-cell measurement.

To perform the additional process in the normal mode, the controller supplies operation power to associated hardware blocks necessary for the additional process. The controller loads a normal mode program from the main memory onto the internal memory. When needed, the dependent variable and the parameter used previously in the internal mode are updated for the normal mode program and the additional process is performed accordingly. In the normal mode, both the internal memory and the external memory are used.

After the additional process is performed, the controller may determine whether to switch to the DRX mode in operation 330. If the controller determines to switch to the DRX mode, the controller may repeat operations 312 through 328.

As described before, when a DRX mode operation is performed according to the control flow of FIG. 3, access of the controller to the main memory can be minimized. The resulting minimization of hardware involved to support the DRX mode leads to reduction of the power consumption in the DRX mode.

As is apparent from the above description of the present disclosure, since a CP is provided with an internal memory and thus performs a DRX mode operation without accessing a main memory outside the CP, power supply to hardware blocks is minimized during the DRX mode operation, thereby minimizing the power consumption the DRX mode.

It should be noted that the various embodiments of the present disclosure, as described above, typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. Such instructions may be stored on one or more processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a predetermined operation by switching between a sleep state and an active state by a communication processor (CP) in a wireless terminal having an application processor (AP) and the CP, the method comprising:
   recording, in an internal memory of the CP, a control program configured for the active state of an internal mode, wherein the internal memory of the CP is dedicated to the CP;
   waking up from the sleep state to the active state of the internal mode at every predetermined interval;
   performing, by the CP, an operation required in the active state of the internal mode by executing the recorded control program in the internal memory of the CP; and
   determining whether to switch from the internal mode to a normal mode,
   wherein the CP operates based on the internal memory of the CP without accessing an external memory during the internal mode, and the CP operates based on the external memory during the normal mode, and
   wherein the recorded control program is a complete control module or a part of the complete control module that is recorded for the operation required in the active state in the external memory.

2. The method of claim 1, wherein the performing of the operation required in the active state comprises:

switching from a normal mode to an internal mode, upon request for switching to a discontinuous reception (DRX) mode;

loading the control program and setting a dependent variable and a parameter to be used in the loaded control program from dependent variables and parameters used in the normal mode; and waking up from the sleep state periodically and performing the operation by executing the control program by the CP.

3. The method of claim 2, wherein the performing of the operation comprises monitoring a paging message.

4. The method of claim 3, further comprising:

determining whether an additional process is needed in the active state according to the performed operation;

switching from the internal mode to the normal mode, if it is determined that the additional process is needed;

loading a supplemental control program required to perform the additional process and performing the additional process using the dependent variable and the parameter in the normal mode; and switching to the internal mode to operate based on the control program, upon request of switching to the DRX mode after the additional process is completed.

5. The method of claim 2, wherein the control program performs an operation in the active state or a part of the complete control module that is stored in the external memory.

6. The method of claim 5, wherein, if the complete control module is stored in the external memory, the internal memory is software-compatible with the external memory.

7. The method of claim 5, wherein, if the switching occurs between the internal mode and the normal mode, operation power is supplied to different hardware.

8. An apparatus for performing a predetermined operation by switching between a sleep state and an active state in a wireless terminal having an application processor (AP) and a communication processor (CP), the apparatus comprising:

an internal memory of the CP that is dedicated to the CP, configured to record a control program configured for the active state of an internal mode, wherein the CP is configured to:

wake up from the sleep state to the active state of the internal mode at every predetermined interval, and perform an operation required in the active state of the internal mode by executing the recorded control program in the internal memory and to determine whether to switch from the internal mode to a normal mode, wherein the CP operates based on the internal memory of the CP without accessing an external memory during the internal mode, and the CP operates based on the external memory during the normal mode, and wherein the recorded control program is a complete control module or a part of the complete control module that is recorded for the operation required in the active state in the external memory.

9. The apparatus of claim 8, wherein the internal memory is further configured to:

store a control program required to perform the operation in the active state, and when a normal mode is switched to an internal mode, load the stored control program.

10. The apparatus of claim 9, wherein upon request of switching to a discontinuous reception (DRX) mode, the CP is further configured to:

switch from the normal mode to the internal mode, control loading of the control program, set a dependent variable and a parameter to be used in the loaded control program among dependent variables and parameters used in the normal mode, wake up from the sleep state periodically, and perform an operation by executing the control program by the CP.

11. The apparatus of claim 10, wherein the operation comprises monitoring a paging message.

12. The apparatus of claim 10, wherein the CP is further configured to:

determine whether an additional process is needed in the active state according to the performed operation performed, switch from the internal mode to the normal mode, if it is determined that the additional process is needed, load a supplemental control program required to perform the additional process, perform the additional process using the dependent variable and the parameter in the normal mode, and switch to the internal mode to operate based on the control program, upon request of switching to the DRX mode after the additional process is completed.

13. The apparatus of claim 10, wherein the control program performs an operation in the active state or a part of the complete control module that is stored in the external memory.

14. The apparatus of claim 13, wherein, if the complete control module is stored in the external memory, the internal memory is software-compatible with the external memory.

15. The apparatus of claim 13 wherein, if the switching occurs between the internal mode and the normal mode, the CP is further configured to control supply of operation power to different hardware.

16. A wireless terminal, the terminal comprising:

a communication processor having an internal memory dedicated to the communication processor, and configured to perform communication functions by executing a control program; and an application processor having an external memory, wherein the communication processor operates based on the internal memory without accessing the external memory during an internal mode, and the communication processor operates based on the external memory during a normal mode, wherein the control program is a complete control module or a part of the complete control module that is recorded for the communication functions in the external memory, wherein, if a size of the recorded control program exceeds a size of the internal memory, a paging module of the control module is stored in the internal memory during a discontinuous reception mode, and wherein the paging module causes the wireless terminal to monitor a paging channel in the discontinuous reception mode.

17. The wireless terminal of claim 16, wherein, if the size of the control module exceeds a size of the internal memory, the internal memory and the external memory are configured to be software-compatible.

18. The wireless terminal of claim 16, wherein the internal memory stores data for monitoring of the paging channel, the data being a subset of data for an active mode operation.

* * * * *